March 3, 1953  L. E. HEBL  2,630,009
COMBUSTION SEVERITY INDICATOR
Filed Aug. 12, 1948  4 Sheets-Sheet 1

INVENTOR.
LORAINE E. HEBL
BY
Fraser, Myers & Manley
ATTORNEYS

March 3, 1953          L. E. HEBL          2,630,009
COMBUSTION SEVERITY INDICATOR
Filed Aug. 12, 1948          4 Sheets-Sheet 2
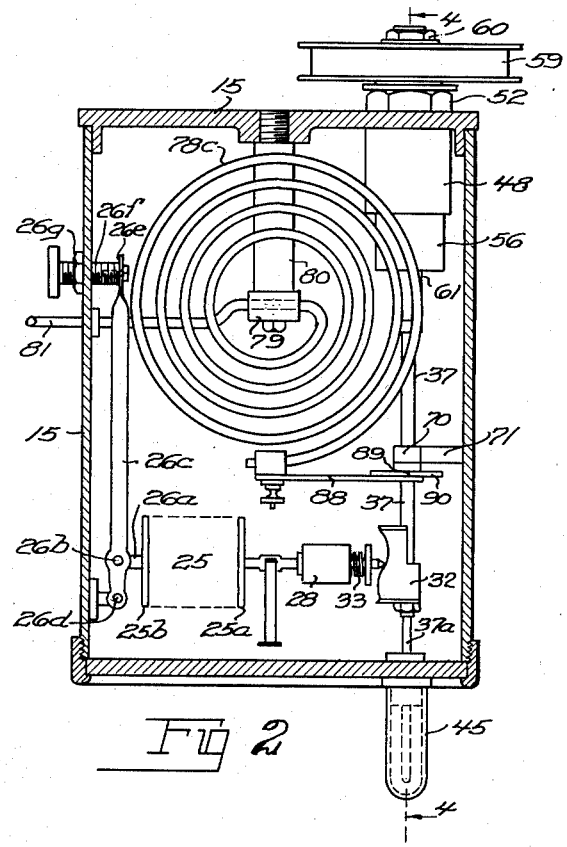
INVENTOR
LORAINE E. HEBL
BY
Fraser, Myers & Manly
ATTORNEYS

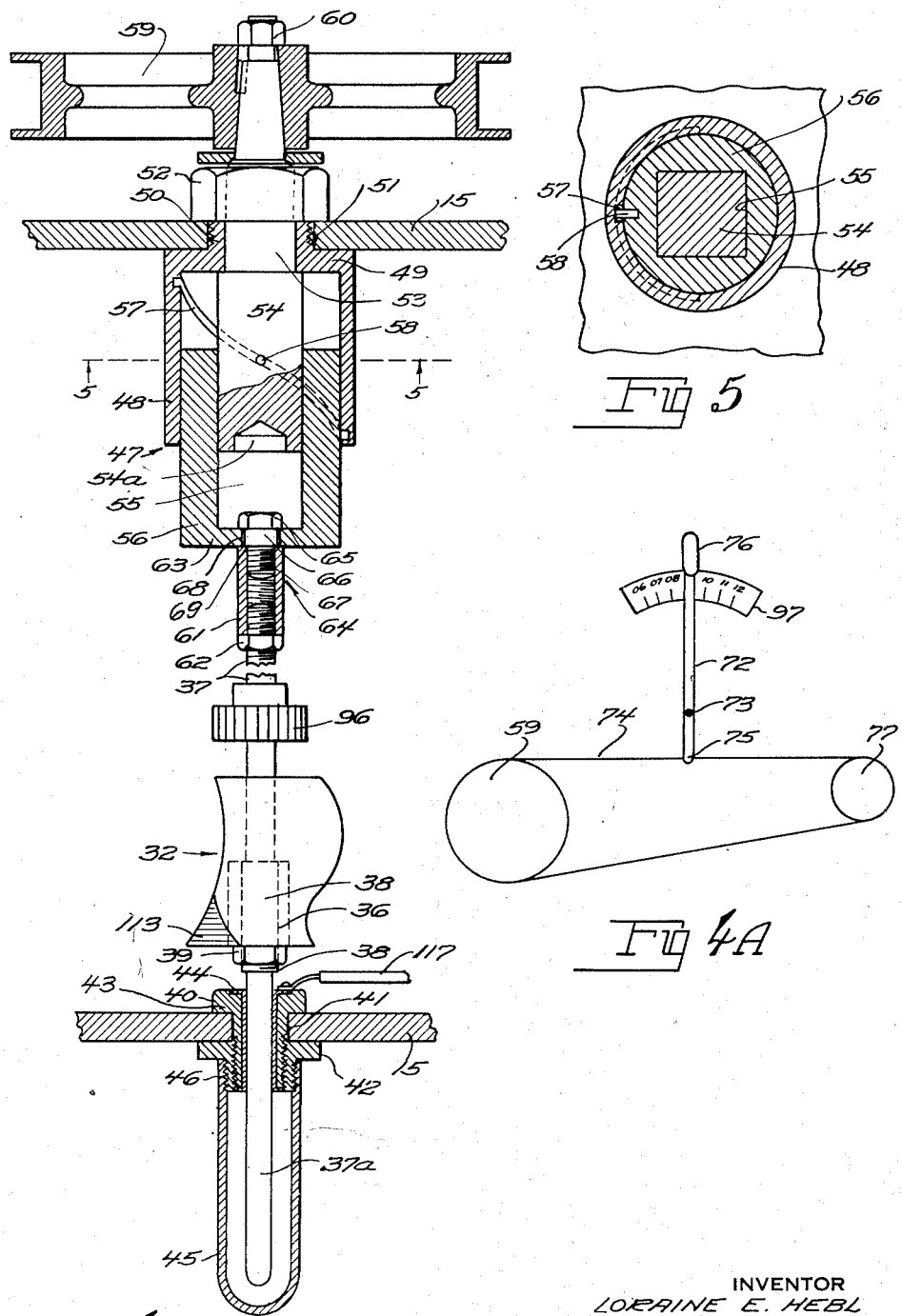

March 3, 1953 L. E. HEBL 2,630,009
COMBUSTION SEVERITY INDICATOR
Filed Aug. 12, 1948 4 Sheets-Sheet 4
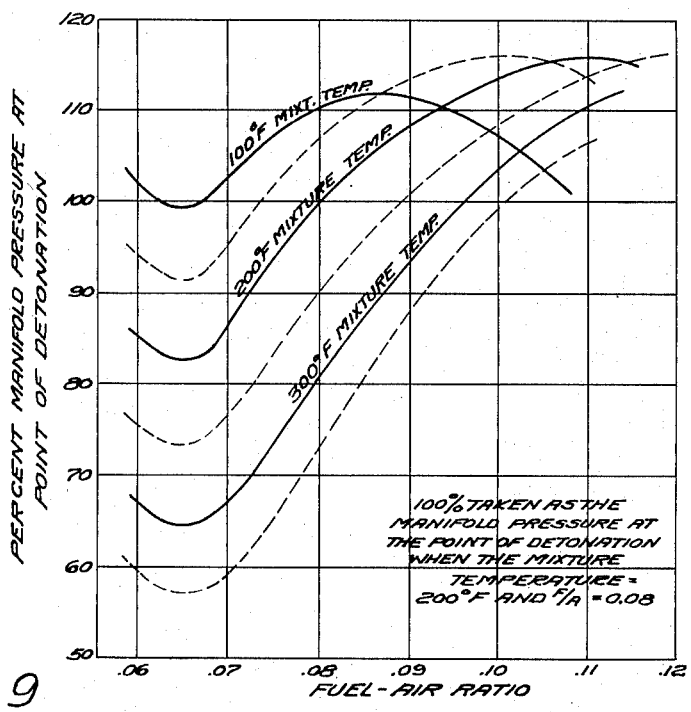
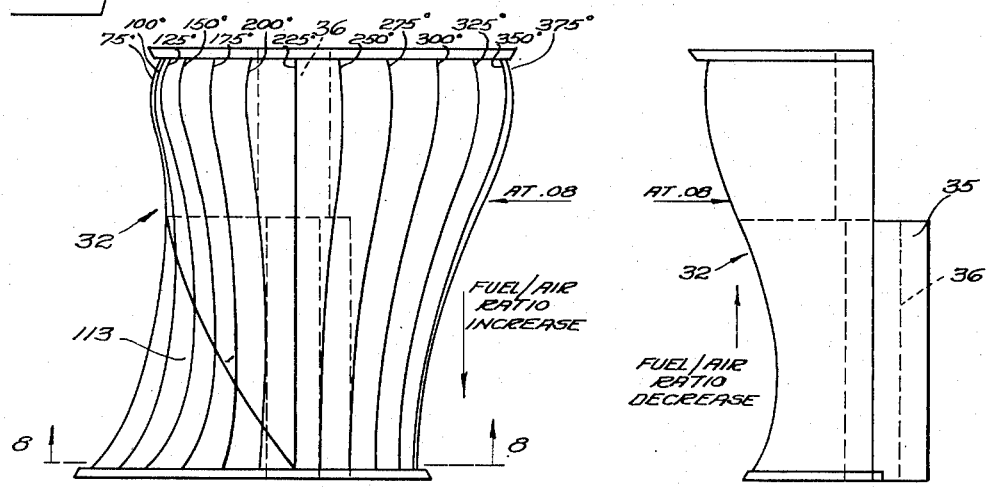
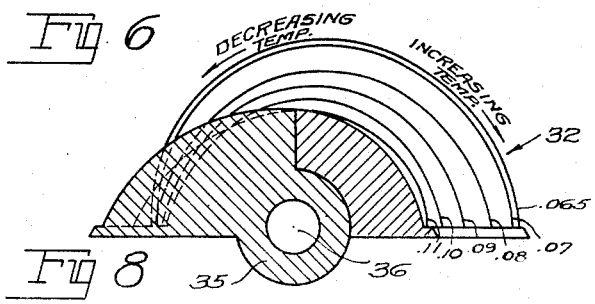
INVENTOR
LORAINE E. HEBL
BY
Fraser, Myers & Manley
ATTORNEYS Patented Mar. 3, 1953

2,630,009

UNITED STATES PATENT OFFICE 2,630,009

COMBUSTION SEVERITY INDICATOR

Loraine E. Hebl, Freeport, N. Y.

Application August 12, 1948, Serial No. 43,935

10 Claims. (Cl. 73—116)

This invention relates to improvements in a combustion severity indicator for reciprocating piston internal combustion engines. Although the usefulness of this invention is probably most pronounced and more readily apparent in relation to such engines for use in aircraft, it is also useful in relation to such engines employed for other purposes.

The efficiency of operation of such engines depends upon several factors, of which an extremely important factor is the presence or absence of so-called "detonation" conditions. Detonation may be defined as extremely rapid, uncontrolled combustion in which a substantial part of the energy of the burned fuel is not released as pressure imposed usefully upon the piston, but is expended in the form of sudden shock and an excessive temperature rise in various parts of the engine. This condition often results in damage to the engine and failure thereof.

An important object of the present invention is the provision of an indicating device which is responsive to various detonation-causing conditions existing in such an engine during its operation.

Another important object is the provision of such an indicating device wherein the response to various such conditions is reflected in a single indicating medium from which one may observe the extent to which the condition of the engine, during operation, approaches detonation conditions.

Another important object is the provision of such an indicating device having a single visible means enabling one, in advance of detonation, to observe and be forewarned by the overall operating condition of the engine so that remedial control steps may be taken to avoid such detonation conditions.

Another important object is the provision of such an indicating device in which a single indicating element is adapted for actuation by one mechanism which responds to the pressure in the intake manifold of the engine to impart one component of movement to the indicating element and, at the same time, is adapted for actuation by another mechanism which is responsive to temperature conditions at one or more points in the engine and also to the ratio of fuel-to-air in the combustible charge to impart another component of movement to the indicating element, so that the latter may reflect engine conditions with respect to possible detonation.

The foregoing and other objects should be apparent from the following description and the accompanying drawings of an illustrative embodiment of the invention.

In the drawings:

Fig. 2 is a reduced scale plan view of the operating mechanism of the indicating device shown in Fig. 1.

Fig. 3 is a similarly reduced side elevation of the operating mechanism of the indicating device as viewed from the right side of Figs. 1 and 2.

Fig. 4 is an enlarged sectional view chiefly illustrating means for moving an indicator-actuating cam element axially in response to manual control of an engine's fuel supply, the section being taken substantially on the line 4—4 of Figs. 2 and 3.

Fig. 4A is a diagram illustrating, in principle, one way in which the structures of Fig. 4 may be arranged for actuation by a fuel control lever of an engine.

Fig. 5 is a cross-sectional view on the line 5—5 of Fig. 4.

Fig. 6 is an enlarged side elevation of a cam suitable for use in an indicating device according to the present invention.

Fig. 7 is a similarly enlarged side elevation of said cam as viewed from a point 90 degrees removed from the viewing point of Fig. 6.

Fig. 8 is a sectional view of the mentioned cam on the line 8—8 of Fig. 6.

Fig. 9 is a graph showing the detonation point of such an engine at various engine temperatures under certain manifold pressure conditions and fuel-to-air ratio conditions of the combustible charge.

Figure 1:
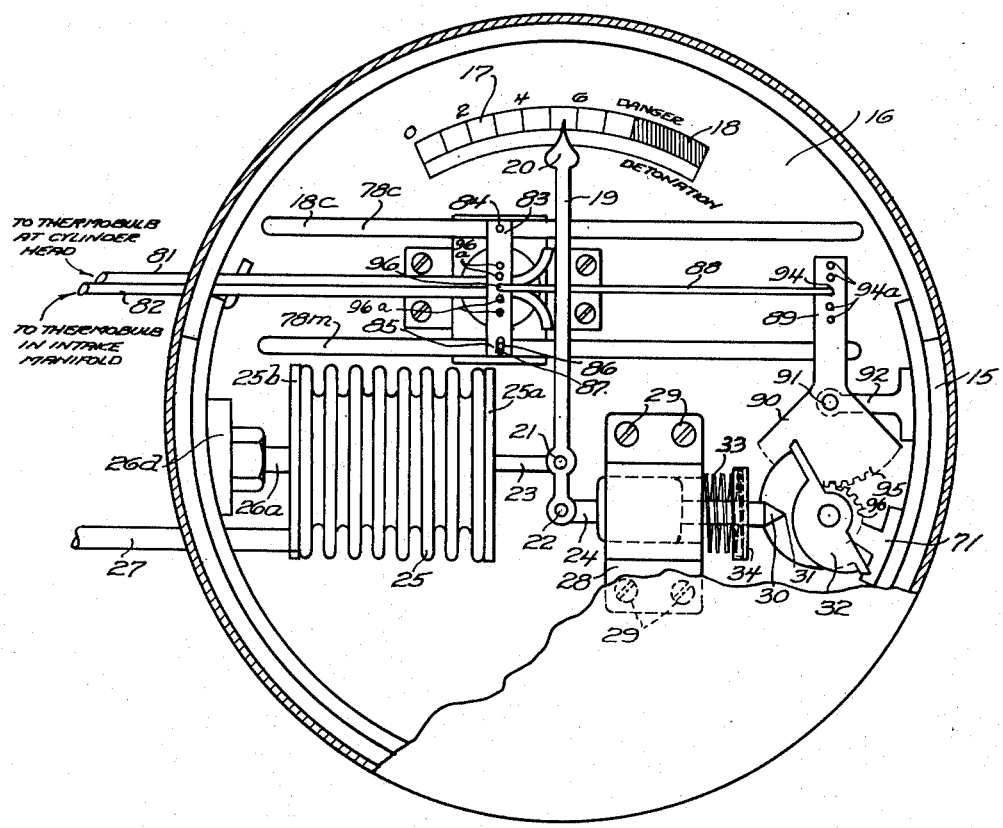
Figure 1 is a front elevation of the operating mechanism of an indicating device according to the present invention.

A combustion-severity indicator according to the present invention is arranged to be actuated in response to the chief factors in operational conditions in an engine which have an effect upon the presence or absence of detonation. In the illustrated embodiment of the present invention, the factors contributing to the movement of an indicating element are the temperatures at one or several points in the engine, as for example, in the intake manifold or at a cylinder head, the pressure in the intake manifold, and the fuel control member, which controls the richness of the explosive charge delivered to the combustion chamber of the engine.

Referring more particularly to the drawings, the indicating device comprises a casing 15 which is generally shown in section in several of the figures in order not to obscure from view the mechanism which is substantially enclosed within the casing. The mechanism includes a dial 16 carrying arcuately arranged calibrations 17 with suitable indicia thereon corresponding to engine conditions under non-detonation operation, and, toward one end of said dial, an area 18, preferably in a distinct color such as red, corresponding to engine operating conditions under which detonation would occur.

Supported within the casing for angular movement across the dial is an indicator in the form of a substantially vertically disposed needle 19, the upper or pointer end 20 of which is visually associated with the dial. The lower end of the needle 19 is pivotally connected at two longitudinally different variable points 21, 22 of the needle to horizontally movable rods 23, 24.

One end of the rod 23 is pivotally connected to the needle 19 at the mentioned connection 21, and the other end of the rod 23 is connected to an end 25a of a bellows 25, the interior of which is connected by a suitable conduit or tube 27 to the interior of the intake manifold of the engine. The bellows 25 preferably is adjustably mounted as, for example, by providing the other end 25b of the bellows with a boss 26a fixed thereto and pivotally connected at an intermediate point 26b of an adjustable rod 26c. This rod is pivoted at one end to a bracket 26d fixed to the casing 15 and is held at its other end within an annular groove 26e of an adjusting screw 26f. The screw 26f is threaded through the adjacent wall of the casing 15 and may be adjusted to set the needle 19 at zero reading. A locknut 26g serves to maintain this adjustment. Assuming that the bellows and the parts coacting therewith to actuate the needle 19 are properly designed, the component of movement derived therefrom by the needle will reflect the variations in the pressure in the intake manifold of the engine.

One end of the rod 24 is pivotally connected to the needle 19 at the mentioned connection 22, and this rod is supported for sliding horizontal movement within a suitable guide member 28 fixed to a front wall of the casing 15 by screws 29. The other end of the rod 24 is formed to function as a cam follower 30 which may have a somewhat rounded, smooth, blunt point 31 coacting with a cam 32 and adapted to be moved horizontally by that cam in response to either rotative or axial movement of the latter in the manner and for the purposes hereinafter explained.

The rod 24 and hence the follower 30, which is formed integrally with that rod, is biased into and maintained in contact with the mentioned cam by a compression coil spring 33 which is disposed about the rod 24 with one of its ends seating against one side of the guide member 28 and its other end seating against a collar 34 fixed to or formed integrally upon the rod 24.

The cam 32 which actuates the rod 24 is movable either axially in response to variations in fuel supply adjustments or rotatably about its axis in response to variations in temperature conditions at one or more points in the engine. This cam is so designed, mounted and actuated, that it may simultaneously move axially and rotatably so that the movements imparted by the cam to the rod 24, and hence to the needle 19, is a resolution of the two mentioned types of movements of the cam.

The cam 32 has a hub portion 35, best seen in Fig. 7, having an axially threaded bore 36 extending completely therethrough and the cam is fixed upon a cam shaft 37 (Fig. 4) by being threaded upon an enlarged exteriorly threaded portion 38 of the cam shaft and is locked in position thereon by a lock nut 39.

The cam shaft 37 is supported toward one end for axial sliding movement within a dielectric bushing 40 which is held in position in an opening 41 in the casing 15 by a lock nut 42 which is threaded upon the mentioned bushing, and serves, with a flange 43 of the bushing, to hold the latter clamped firmly in place upon marginal portions of casing 15 defining the opening 41. The bushing 40, for purposes hereinafter explained, is provided with a lining in the form of an electrically-conductive metal sleeve 44 within which and in contact with which an extension 37a of the cam shaft extends and slides. A protective cap 45 enclosing the extension 37a may be threaded upon an exteriorly threaded portion of the locknut 42, as indicated at 46.

The other end of the cam shaft 37 is connected for support and axial movement to a telescoping, axially-extensible assembly, generally indicated at 47. This assembly may include a non-rotatable cup-shaped outer telescoping element 48 having toward one end an annular shoulder 49 in contact with the inner face of an adjacent wall portion of the casing 15 and a reduced bushing portion 50 integral with the shoulder 49 and extending through an opening 51 in the mentioned wall. A locknut 52, threaded upon the outer end of the bushing 50, holds the latter securely in place within the opening 51.

A stub shaft 53 extends through the bushing 50 and is formed with an integral inner-end portion 54 of square cross-section which, as best understood from Fig. 5, extends with a close but, nevertheless, sliding fit, within a square cross-sectional recess 55 in a cup-shaped inner telescoping element 56. The outer surface of the inner telescoping element 56 is cylindrical and fits with a close sliding fit within a corresponding inner cylindrical surface of the outer telescoping element 48. The latter element has a spiral groove 57 formed in the inner face of its cylindrical wall, and the inner telescoping element 56 has a pin 58 fixed therein and extending laterally therefrom into the groove 57.

A pulley wheel 59 for rotating the shaft 53 is keyed to the outer end of the latter and held thereon by a nut 60. Rotation of the shaft 53 causes rotation of the inner telescoping element 56 which, because of the mentioned pin and groove arrangement, slides axially within the non-rotating outer telescoping element 48 in an axial direction which depends upon the direction of rotation of the pulley wheel 59.

As it is desired that the cam shaft 37 should not respond to the rotation of the inner telescoping element 56 but should respond only to the axial movement of the latter, the connection of the cam shaft thereto is designed with that requirement in mind. This connection may be in the form of an internally threaded sleeve 61, threaded upon the adjacent end of the shaft 37 and locked thereon against rotation by a lock nut 62. The other end of the sleeve 61 is connected to the adjacent end wall 63 of the telescoping element 56 by a machine bolt 64 having a head 65, a neck 66, and a reduced threaded portion 67. The bolt 64 extends from inside the telescoping element 56, through an opening 68, and its threaded end 67 is threaded into the adjacent end of the sleeve 61. The diameter of the neck 66 of the bolt is such as to fit accurately but, nevertheless, freely rotatably within the opening 68. The axial length of the neck 66 is slightly greater than the thickness of the wall, so that, when the bolt 64 is threaded as tightly into the sleeve 61 as permitted by a shoulder 69 at the juncture of the neck and reduced threaded portion of the bolt, a connection is established between the cam shaft 37 and the inner telescoping element 56 which permits rotation of the latter without corresponding rotation of the cam shaft, but, nevertheless, constrains the cam shaft to follow the axial movements of the inner telescoping element 56. The inner end of the square end portion 54 of the stub shaft preferably is recessed as at 54a so that the head of the bolt 64 may nest therein in the innermost telescoping relation of the assembly 47.

In order to further assure freedom of rotation of the telescoping element 56 independently of the cam shaft, the latter preferably is supported at an intermediate point within a suitable bearing 70 in an interior wall or bracket 71 in the device. This intermediate support for the shaft obviates the need for any support thereof within the opening 68 and hence minimizes friction at that point during rotation of the telescoping element 56.

Suitable means are provided for rotating the pulley wheel 59 in response to manual adjustments in the richness of the combustible fuel charge. Such means, for example, may be as shown diagrammatically in Fig. 4A, wherein a manually operable fuel-supply control lever 72 is pivotally mounted at an intermediate point thereof at a fixed point 73. An endless cable 74, or a chain or equivalent transmission means, is fixed at an end portion 75 remote from a handle portion 76 of the lever and the cable extends about the periphery of the pulley wheel 59 in driving relation thereto and about one or a plurality of idler pulleys 77, one such pulley being shown for illustrative purposes. Under this or an equivalent arrangement, movement of the fuel control lever 72 by one operating the engine will cause rotation of the pulley wheel 59, which through the described resulting axial movement of the inner telescoping element 56 will cause axial movement of the cam shaft 37 and of the cam 32 carried thereon. Assuming that the cam and its axial actuating means are properly designed, its axial movement will impart to the indicating element 19 a component of movement indicative of the effect of the mentioned fuel-control lever movement upon the severity of combustion in the engine.

It should be understood that, if the engine carburetor is of the type which, except under idling conditions, maintains a set fuel-to-air ratio in the combustible charge under all engine operating speeds, a single manually shiftable control element, such as the lever 72, may serve to vary the fuel-to-air ratio in direct proportion to the extent of its movement; hence an indicator according to this invention, operatively associated with such a lever will yield a substantially accurate indication of the engine's operating condition. However, if the carburetor is of a type which is subject to some form of automatic control of the fuel-to-air ratio at various operating speeds of the engine, a single movable member, corresponding to lever 72, should be arranged to respond to all such automatic control means proportionately to the fuel-to-air ratio variations which said control means establish in the operation of the engine; also if desired, such a control element may be arranged to impose manual control on such a carburetor under some conditions wherein automatic control is not desired. In either arrangement, such a single control element, associated with such an automatic carburetor, should contribute to a substantially correct indication of engine conditions when associated with an indicator according to this invention.

Rotation of the cam 32 is controlled by temperature conditions at one or more parts of the engine, preferably, as indicated in the drawings, by temperature conditions at the intake manifold of the engine and at a cylinder head thereof under an arrangement wherein an average or a resolution of the temperatures at those two points is utilized to rotate the cam 32. A mechanism for this purpose, as illustrated in Figs. 1–3, may include a pair of spiral thermometer elements 78c, 78m, similarly supported in horizontal positions one above the other in spaced relation by a suitable clamp 79 which is supported by a bracket 80 suitably fixed to the rear wall of the casing 15. The clamp 79, as best understood from Figs. 2 and 3, holds the thermometer elements 78c and 78m at one end of the spiral portion of each, which is connected by a suitable tube to the part of the engine with respect to the temperature of which it is intended to respond. In Figs. 1 and 2, there is shown a tube 81 as a connection between the thermometer element 78c and a thermobulb (not shown) located at a cylinder head of the engine, and in Fig. 1 there is shown a tube 82 as a connection between the thermometer element 78m and a thermobulb (not shown) located within the intake manifold of the engine.

The free ends of the thermometer elements 78c and 78m are pivotally connected to opposite ends of a floating bar 83 as at 84 and 85, respectively. Preferably one of these connections should be in the form of a pin 86 secured to one of the spiral thermometer elements and extending through a longitudinally elongated slot 87 in the floating bar 83, so that angular movement of the latter will be unrestrained and will not materially disturb the horizontal attitudes of the several thermometer elements. A link 88 is pivotally connected at one end to an intermediate point on the bar 83 and at its other end is connected to an integral arm 89 of the toothed segment 90, which is pivotally supported at a fixed point 91 on a bracket 92 suitably fixed to an adjacent portion of the casing 15.

The pivotal inner connection of the link 88 with the arm 89 may be effected, as best seen in Fig. 3, by having an end portion 93 of the link bent and extended through an aperture 94 in said arm, and held therein by a cotter pin 95. The other end of the link 88 may be similarly bent and held by a similar cotter pin (not shown) within an aperture 96 in the bar 83.

Plural alternative apertures 96a may be provided at different intermediate longitudinal points on the bar 83 into any one of which the adjacent end of the link 88 may be connected instead of in aperture 96. These alternative apertures permit connection of the link to the bar 88 in such a manner as to cause the endwise movement of the link 88 to be effected to a greater extent by a given degree of expansion or contraction movement of one of the spiral thermometer elements than by a similar movement of the other of the thermometer elements. Also, plural alternative apertures 94a may be provided at different longitudinal points on the arm 89 into any one of which the adjacent end of the link 88 may be connected instead of in aperture 94. These alternative apertures permit connection of the link to the arm 89 in such a manner as to cause the endwise movement of the link 88 to impart a more pronounced or a less pronounced rotation of the toothed segment 90 in response to a given longitudinal movement of the link 88.

The segment 90 is provided with teeth 95 on its arcuate edge, to engage and drive a pinion 96 which is suitably fixed against relative rotation upon the cam shaft 37. Thus, through the medium of the link 88, the toothed segment 90 and the pinion 96, the cam shaft 37 and the cam 32 are rotated in response to expansion and contraction of the spiral thermometer elements 78c, 78m caused by variations in the temperatures at the cylinder head and in the intake manifold. Assuming that the cam and the described related parts for rotating it are properly designed, the rotation of the cam will impart a component of movement to the needle 19 indicative of the temperature variations in the mentioned several parts of the engine.

The contour of the cam 32 may be determined by experimentation, but it is important, for this purpose, to have knowledge of the relationship of manifold pressure, engine temperature and the richness of the combustible charge as causes contributing to detonation. For the purpose of the present explanation, it is assumed that the graph, Fig. 9, indicates the result of engine tests and reflects this relationship with reasonable accuracy with respect to an engine which may be considered as an average or representative of reciprocating-piston, internal-combustion engines in their present state of development.

In the graph the mentioned relationship is indicated by horizontal lines for manifold pressure, vertical lines for the richness of the combustible charge and curved lines for engine temperature. The manifold pressure is shown in percentages, using 100 per cent to represent said pressure at the point of detonation when the engine temperature is 200° F. and the fuel-to-air ratio is .08. The area on this graph above any given temperature curve is indicative of the various combinations of manifold pressure and fuel charge richness at which detonation would occur at the given engine temperature. Thus, at 100 per cent manifold pressure and a .08 fuel-to-air ratio fuel charge, the engine would operate at non-detonation condition at temperatures below 200° F. but detonation would occur at higher engine temperatures; or, as stated differently, at 100 per cent manifold pressure and 200° F. engine temperature a fuel-to-air ratio of less than .08 would cause detonation while if this ratio is higher, detonation would be avoided.

Of the three mentioned detonation factors, the fuel-to-air ratio ordinarily may be varied most easily by an operator of the engine to avoid detonation conditions the approach of which is indicated by the position of the needle 19. Upon observing from the indicating device that operating conditions are dangerously close to detonation, the operator, in most instances, may avoid detonation by increasing the richness of the fuel charge, as for example, by moving the handle 76 of the fuel lever 72 rightwardly to increase the fuel-to-air ratio from the .08 setting mentioned in the examples in the preceding paragraph to, say, .085 or .09 setting. This adjustment not only avoids detonation, but automatically, by the means already described, shifts the cam 32 axially and thus moves the needle 19 to accurately indicate the engine operating condition under the altered fuel charge.

Figs. 6–8, inclusive, illustrate approximately the shape of cam 32, which, in the described mechanism, would contribute to the positioning of the pointer 29 to give a reasonably accurate indication of the severity of combustion. In Fig. 6 the curved lines extending from end to end of the cam indicate approximately the paths which would be pursued by the cam follower 30, at the engine temperatures applied to those lines, if the cam were shifted axially to its greatest possible extent by extreme shifting of the fuel lever 72. In Fig. 8 the substantially semi-circular lines indicate approximately the paths which would be pursued by the cam follower 30, at the fuel-to-air ratios applied to those lines, if the cam were rotated by the thermometer elements throughout the complete temperature range for which the cam is designed.

It is understood, of course, that the cam would seldom, if ever, pursue these extreme axial and rotational movements in actual practice, and also that the cam follower would seldom, if ever, precisely follow these lines. Ordinarily the engine would operate at a combination of temperatures, manifold pressure and fuel adjustment that would keep it within non-detonation conditions; hence, the cam movements would ordinarily be less than its extreme possible movements and the movement would be a resolution of the two mentioned sets of lines because the cam would continuously be under the influence of both the variations in engine temperature and the variations in the fuel control.

The indicating device, as hereinbefore described, should indicate the combustion severity of an engine with reasonable accuracy. The foregoing description, however, assumes that detonation, in all circumstances, may be avoided by merely increasing the fuel-to-air ratio. While this assumption is substantially true, nevertheless, the graph (Fig. 9) shows that under some low-temperature conditions, as when the engine is operating at slightly above 100° F. and at about .085 fuel-to-air ratio, an increase of the fuel-to-air ratio would actually bring the engine operation closer to or into detonation condition. The present invention, in addition to indicating combustion severity, may include means by which the operator may be given a distinctive warning signal if low-temperature detonation conditions are imminent and are such that they cannot be remedied by an increase in the fuel-to-air ratio but must be remedied, if possible, by other means.

Means, within this invention, for giving such a distinctive warning signal, may preferably be electrical and may include one signal as, for example, a horn for indicating imminent detonation conditions and a separate signal as, for example, a light for warning that enrichment of the fuel charge would not remedy the condition.

The means for effecting such a distinctive warning signal or signals may best be understood from the electrical diagram, Fig. 10, from which it may be observed that in an electric circuit suitably grounded at 100, the needle 19 is connected by a wire 101 to one side of a battery 102 or other suitable current generating means, and a contact point 103 is arranged in position for electrical contact with the needle 19 at a point just below the detonation area of the dial 16, so that, when the needle, in response to engine conditions as hereinbefore described, makes contact with the contact point 103, a circuit from the battery is completed through a wire 104 and the coil 105 of a relay 106 and another wire 107 which connects the relay coil to the other side of the battery 102.

The mentioned connection, through the coil 105, energizes the latter which thereupon magnetically draws an armature-contactor 108 into engagement with a contact point 109, thereby completing a circuit from one side of the battery through wires 101, 110, an electric horn 111, wire 112, armature-contactor 108, and wire 107 to the other side of the battery to energize and sound said horn. The horn will continue to sound until some engine adjustment, as for example, enrichment of the fuel, is effected or some other operating change occurs to restore the engine to non-detonation conditions. Upon such restoration, the needle 19 breaks contact with the contact point 103, thereby de-energizing the relay coil 105 so that the latter will release its armature-contactor 108 and thereby break the described circuit through the horn. Thus, the electrical apparatus, as thus far described, serves in all cases to give an audible signal of the imminence of detonation conditions. It will be understood, of course, that instead of the audible signal, an electric lamp or other suitable electrically operated signalling device could be substituted in the described circuit.

The electrical system, however, in conjunction with the described indicating device, preferably should serve also to inform the operator of the engine as to whether an approaching detonation condition may be avoided by enriching the fuel charge. For this purpose, the cam 32 has a portion 113 of its cam surface formed of electric-conducting material which may be a suitable metal, this conducting surface being best seen as a substantially triangular surface in Fig. 6. The cam surface portion 113 corresponds substantially to the inter-relationship of the factors of temperature and fuel-to-air ratio at which an approach to detonation may not be remedied by enrichment of the fuel charge. The mentioned inter-relationship, as hereinbefore mentioned, exists at low engine operating temperatures, when imminent detonation cannot be avoided by enrichment of the fuel mixture, as for example when an engine is operating at about 100° F. and at a fuel-to-air ratio of about .085. Except for the mentioned conducting surface 113 of the cam, the latter is of non-conducting material.

Figure 10:
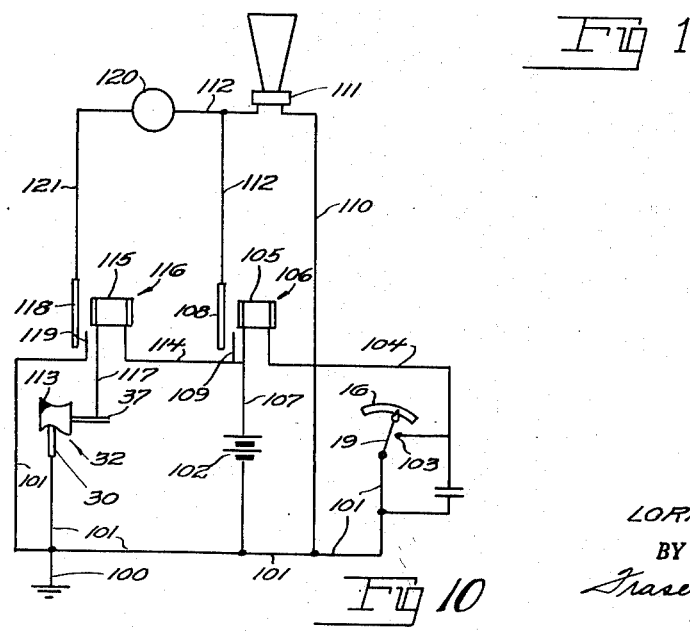
Fig. 10 is an electrical diagram illustrating the operation of certain electrical indicating means which may be associated with the structures of Figs. 1-8, inclusive, to afford an indication not only of the approach of an engine to detonation condition but also the nature of engine adjustments which may serve to avoid detonation under certain conditions.

The cam 32 is so designed that its conducting surface 113 is in electric connection through its hub 35 with the cam shaft 37, and through lining 44 of the bushing 40 and wire 117 (Fig. 4) the cam is connected in the electrical system diagrammed in Fig. 10. The cam follower 30 also is of electric conducting material and is suitably connected in the mentioned electrical system as indicated in Fig. 10. For convenience, the engine operating conditions at which imminent detonation may not be prevented by fuel enrichment are referred to hereinafter and in the accompanying claims merely as "low-temperature conditions" to distinguish from higher temperature operating conditions at which fuel enrichment would serve to prevent detonation.

Assuming that an engine is operating at low-temperature conditions imminent to detonation conditions, the contact of the needle 19 with contact point 103 will give the previously described audible warning or other substitute warning of engine conditions. In addition, however, because of the fact that the follower 30 is in contact with the conducting cam surface 113, a further set of circuits is established. One of these further circuits may be considered as passing from one side of the battery 102 through wire 107, and a wire 114 to a coil 115 of a second relay 116, thence by wire 117 to conductive cam shaft 37, to the cam surface 113, and to the follower 30 then in contact with that surface, the follower being connected by wire 101 to the other side of the battery.

The mentioned circuit through the second relay energizes the latter's coil 115 which has the effect of drawing armature-contactor 118 into contact with a contact point 119, thereby completing another circuit from one side of battery 102 through wire 107, armature-contactor 108, wire 112, an electric lamp 120, preferably of a distinctive color, thence by a wire 121 through armature-contactor 118 and wire 101 to the other side of the battery. This circuit, energizing electric lamp 120, may be established only while relay 106 is energized and only while the cam 30 is in contact with the conducting cam surface 113. As the latter surface is effective only under low-temperature conditions, it is obvious that the lamp 120 will serve as a visual signal only under such low-temperature conditions to serve as a warning to the operator that avoidance of detonation may be accomplished only by means other than enrichment of the fuel charge. Under operating conditions other than low-temperature conditions, the lamp 120 will not operate so that when the horn 111 sounds and the lamp 120 is not lit, the operator will know that fuel enrichment will have the effect of avoiding detonation.

Although this invention may be employed for more efficiently controlling engines employed for various purposes, nevertheless, it serves an exceptionally useful purpose in the control of aircraft engines. In aircraft operation, engine efficiency is of the utmost importance in connection with safety and this invention contributes to safety by enabling a pilot to operate the engine under most efficient operating conditions and to avoid operating the engine under conditions which might cause it to break down. Also, of course, the matter of fuel economy is important, not only from the standpoint of expense, but from the standpoint of assuring, insofar as possible, that a given fuel load will suffice for the completion of a particular flight. The present invention serves these purposes admirably.

Aircraft engines, in use, undergo frequent changes in operating conditions, as for example, during cruising operation or in ascending and descending, both on takeoff and landing and also, during flight, to maintain an altitude yielding the most favorable flying conditions. Also, wide variations in temperature and air pressure are encountered at different altitudes. This invention gives immediate indication of changes of operational conditions of the engine resulting from such physical changes encountered in flight, thereby enabling the pilot to vary the engine controls to maintain its most efficient operation.

Even if engine condition variations were separately known to the pilot continuously, their relatively rapid fluctuations would, nevertheless, make it practically impossible for the pilot to correlate those factors rapidly enough to maintain most efficient fuel-to-air ratio under various flight conditions. The present device correlates these factors continuously to afford a single ever-present indication of combustion severity and also to afford an indication as to whether or not approaching detonation may be avoided by adjustment of the fuel-to-air ratio.

It should be obvious that the present inventive concept may be embodied in various structures, other than those disclosed and described in the foregoing specification, and, therefore, the present invention should not be limited except as indicated in the following claims.

What I claim is:

1. A combustion severity indicator for an internal combustion engine comprising, in combination, a movable indicating element, a cam follower, a cam mounted to have both rotative and axial directions of movement relative to such follower, the surface of said cam being developed to correspond in one of said directions of movement with variations in the detonation limits of said internal combustion engine with variations in its internal temperature and to correspond in the other of said directions of movement to the effect of variations in fuel to air ratio on said detonation limits of said engine, means responsive to internal temperature variations of said engine for imparting relative movement between said cam and said follower in accordance with the internal temperature of said engine, means responsive to variations in the ratio of fuel to air as supplied to said engine for imparting relative movement between said cam and said follower in accordance with said variations, said cam follower being operatively connected to said indicating element and adapted to impart to it the resolution of said axial and rotative movements.

2. A combustion severity indicator for an internal combustion engine comprising a single, visible indicating element movable to various positions indicative of combustion conditions in the engine, a pressure responsive element connected to the engine's intake manifold and coacting with said indicating element to impart to the latter a first component of movement, a cam, movable in both axial and rotative characters of movements and having cam surfaces varying predeterminately with each of such movements and coacting with the indicating element to impart thereto a second component of movement, a temperature-responsive actuating device connected to and influenced by the temperature in the engine's intake manifold, another temperature-responsive actuating device connected to and influenced by the temperature at a cylinder head of the engine, motion-transmitting means connected between both said actuating devices and said cam to impart one of said characters of movement to the latter, a manually operable control member for controlling the richness of fuel as supplied to the engine, and separate motion-transmitting means connected between said control member of the engine and said cam to impart another of said characters of movement to the latter.

3. A combustion severity indicator according to claim 1 further characterized in that the cam means, as a part of its said cam surfaces, has an electrically conductive surface portion which is curved to correspond substantially to a limited combination of variations of engine temperature and fuel richness at which an increase in the fuel richness will not reduce the approach of engine operating conditions to the point of detonation, the indicator further comprising a first electric circuit including a first electrical indicating device, the said circuit being under control of said movable indicating element for energizing and operating said first electrical indicating device when said element reaches a predetermined point of its movement, and a second electric circuit including a second electrical indicating device and also including said conductive cam surface.

4. A combustion severity indicator according to claim 3, the said first circuit including a relay having a normally-open contactor in the second circuit, whereby the second circuit may be closed only when the first circuit is energized.

5. A combustion severity indicator for an internal combustion engine comprising a movable indicating element, an expansible pressure container, operatively connected between the engine's intake manifold and said indicating element to move the latter approximately in proportion to pressure variations in said manifold, a cam which is rotatable and also movable in line with its axis of rotation and has cam surfaces of reverse curvatures relatively to its line of movement in one direction, a cam follower in yieldable contact with said cam and adapted to move in response to such movements of said cam and being connected to said indicating element to move the latter, temperature responsive means thermally coupled to a part of the engine which is substantially subject to temperature variations from the combustion therein, and coacting with the cam to rotate the latter, and actuating means coacting with the cam and a movable fuel-richness control member of the engine for imparting axial movement to the cam; the curvatures of the cam relatively to its lines of rotary movement corresponding approximately to ascertain effects of variations in engine temperature upon combustion severity therein at a series of variations in the richness of fuel being supplied to the engine, and the curvatures of the cam relatively to its lines of movement in line with its axis of rotation corresponding approximately to ascertain effects of variations in the richness of fuel being supplied to the engine upon combustion severity therein at a series of variations in the engine temperature.

6. A combustion severity indicator for an internal combustion engine comprising a movable indicating element, cam means mounted for plural characters of movements and having cam surfaces effective in response to such plural characters of movements, a cam shaft to which the cam means are fixed, a cam follower coacting with said cam surfaces to derive movement therefrom and connected to said indicating element to move the latter, means responsive to engine temperature variations to rotate said shaft and cam means about their axes, and transmission means connected to said cam shaft and to a fuel-richness control member of the engine to derive movement from the said member and transmit it to said shaft to shift the latter and the cam means axially, the said transmission means comprising a shift element, having a cylindrical portion and being freely rotatable relatively to the said cam shaft and connected thereto to constrain the two to shift axially in unison, a driving element, non-rotationally associated with said shift element, means connecting said driving element to the fuel-richness-control member of the engine to derive rotation therefrom, and an element having a fixed portion adjacent said cylindrical portion of the shift element, one of the two latter portions having a spiral groove therein proximate to the other of the two portions and the said other portion having a member slidable in said groove to cause the shift element and the cam to shift axially in response to rotation of the driving element by movement of the said control member.

7. A combustion severity indicator for an internal combustion engine comprising, in combination, a movable indicating element, a cam mounted to have both rotative and axial directions of movement, the surface of said cam being developed to correspond in one of said directions of movement with variations in the detonation limits of said internal combustion engine with variations in its internal temperature and to correspond in the other of said directions of movement to the effect of variations in fuel to air ratio on said detonation limits of said engine, means responsive to internal temperature variations of said engine for moving said cam in accordance with the internal temperature of said engine, means responsive to variations in the ratio of fuel to air as supplied to said engine for moving said cam in accordance with said variations, and a cam follower to receive the resolution of axial and rotative movements of the cam operatively connected to said indicating element.

8. A combustion severity indicator for an internal combustion engine comprising in combination a movable indicating element, a cam mounted to have both rotative and axial directions of movement, said cam having a surface developed to correspond in the rotative direction of movement with variations in the detonation limits of said internal combustion engine with variations of its internal temperature and to correspond in the axial direction of movement to the effect of variations in fuel to air ratio on said detonation limits of said engine, cam rotating means responsive to internal temperature variations of said engine for angularly positioning said cam in accordance with the internal temperature of said engine, cam moving means responsive to changes in the ratio of fuel to air supplied to said engine for axially positioning said cam in accordance with said changes, a cam follower coacting with said cam surface to receive the resolution of axial and rotative movements of the cam, and translating means connecting said cam follower and indicating element.

9. A combustion severity indicator for an internal combustion engine comprising in combination a movable indicating element, a cam mounted to have both rotative and axial directions of movement, the surface of said cam being developed to correspond in the rotative direction of movement with variations in the detonation limits of said internal combustion engine with variations of its internal temperature and to correspond in the axial direction of movement to the effect of variations in fuel to air ratio on said detonation limits of said engine, a cam follower coacting with said cam surface and with said indicating element to apply additively to said indicating element quantitative movements proportional to changes in said detonation limits, cam actuating means moving said cam rotatively as the internal temperature of said internal combustion engine varies, and cam actuating means moving said cam axially with variations of the ratio of fuel to air supplied to said internal combustion engine.

10. A combustion severity indicator for an internal combustion engine comprising in combination a movable indicating element, a cam mounted to have both rotative and axial directions of movement, the surface of said cam being developed to correspond in the rotative direction of movement with variations in the detonation limits of said internal combustion engine with variations of its internal temperature and to correspond in the axial direction of movement to the effect of variations in fuel to air ratio on said detonation limits of said engine, a cam follower coacting with said cam surface and with said indicating element to apply additively to said indicating element quantitative movements proportional to changes in said detonation limits, cam actuating means moving said cam rotatively as the internal temperature of said internal combustion engine varies, cam actuating means moving said cam axially with variations of the ratio of fuel to air supplied to said internal combustion engine, and pressure responsive means operatively connected to said indicating element to apply additively thereto a component equivalent to the manifold pressure of said internal combustion engine.

LORAINE E. HEBL.

REFERENCES CITED

The following references are of record in the file of this patent:

UNITED STATES PATENTS

| Number | Name | Date |
|---|---|---|
| 1,478,090 | Wood | Dec. 18, 1923 |
| 1,511,574 | Mortsell | Oct. 14, 1924 |
| 1,542,096 | Riblet | June 16, 1925 |
| 1,881,266 | DeGiers | Oct. 4, 1932 |
| 2,052,764 | Harrison | Sept. 1, 1936 |
| 2,137,530 | Johnson | Nov. 22, 1938 |
| 2,331,128 | MacNeil | Oct. 5, 1943 |

FOREIGN PATENTS

| Number | Country | Date |
|---|---|---|
| 562,857 | Great Britain | July 19, 1944 |